Figure 1:
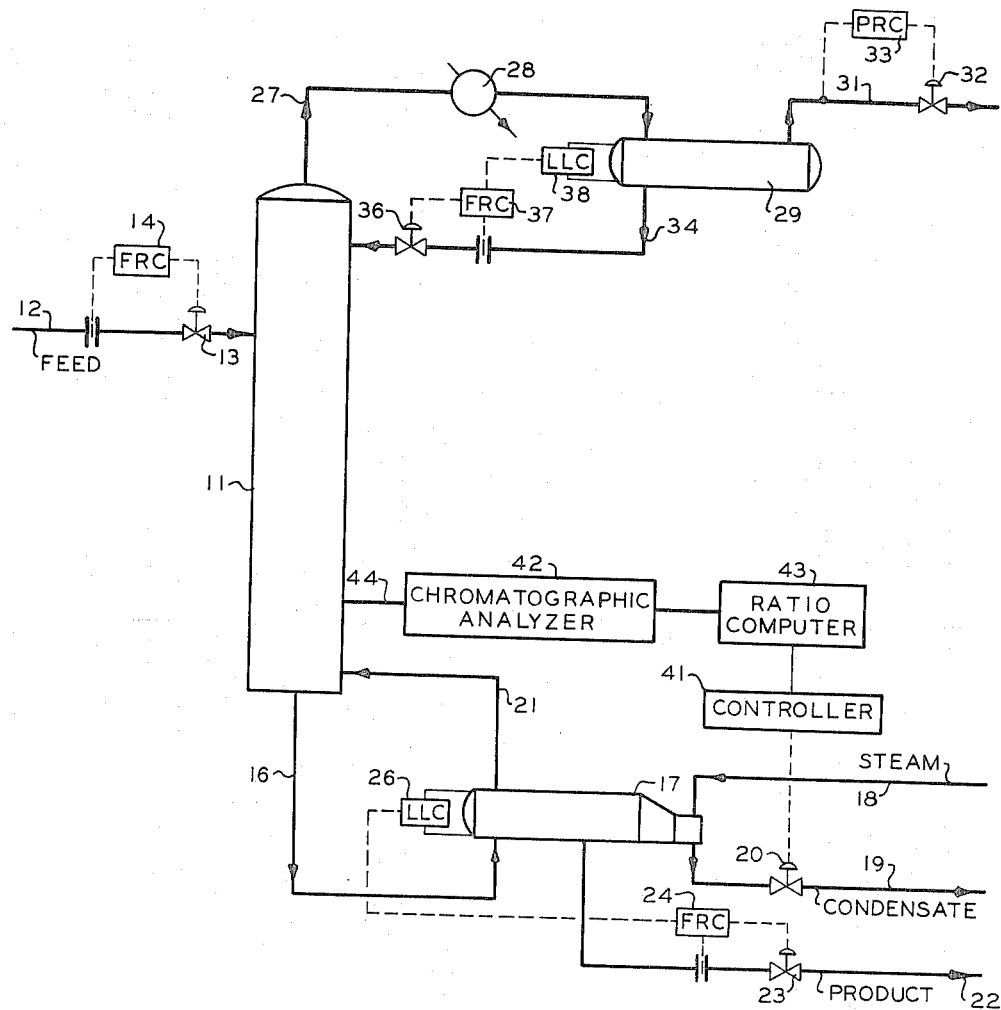

INVENTOR.
M. M. FOURROUX
BY Hudson E. Young
ATTORNEYS

United States Patent Office 3,208,230
Patented Sept. 28, 1965

3,208,230
AUTOMATIC CONTINUOUS FEEDBACK
PROCESS CONTROL
Melvin M. Fourroux, Bartlesville, Okla., assignor to Phillips Petroleum Company, a corporation of Delaware
Filed Feb. 29, 1960, Ser. No. 11,659
10 Claims. (Cl. 62—21)

This invention relates to an automatic continuous feedback process control system. In another aspect it relates to a method and apparatus for the automatic continuous process control of a fractionator column, such as a deethanizer column in a natural gasoline plant.

In various chemical and petroleum operations, and the like, the constituents of fluid mixtures, such as mixed hydrocarbon stocks, are separated by means of fractionator columns, or the like. The removal of a constituent of fraction as bottoms, sidestream, or overhead from the column is dependent, among other things, on the temperature and pressure within the column. To achieve the desired separations by means of fractionation, heat is supplied to the column, generally by means of the indirect heat exchange of the fractionator column bottoms with a heat exchange medium, such as steam, in a reboiler, either internal or external. While the heat input of the column can be calculated to achieve the necessary separation, or purity of product, variations in feedstock composition, ambient temperature, and other factors make the control of the heat input difficult, and the desired specification of fractionator products is not always readily achieved. While many automatic control devices and systems have been proposed, patented, or used, many of these automatic systems have been found wanting for various reasons. For example, many of these prior systems are inadequate because they are based on temperature, vapor pressure, refractive index, infrared absorption, or other non-specific measurements of unresolved samples, rather than the individual analysis of constituents of a sample.

Figure 2:
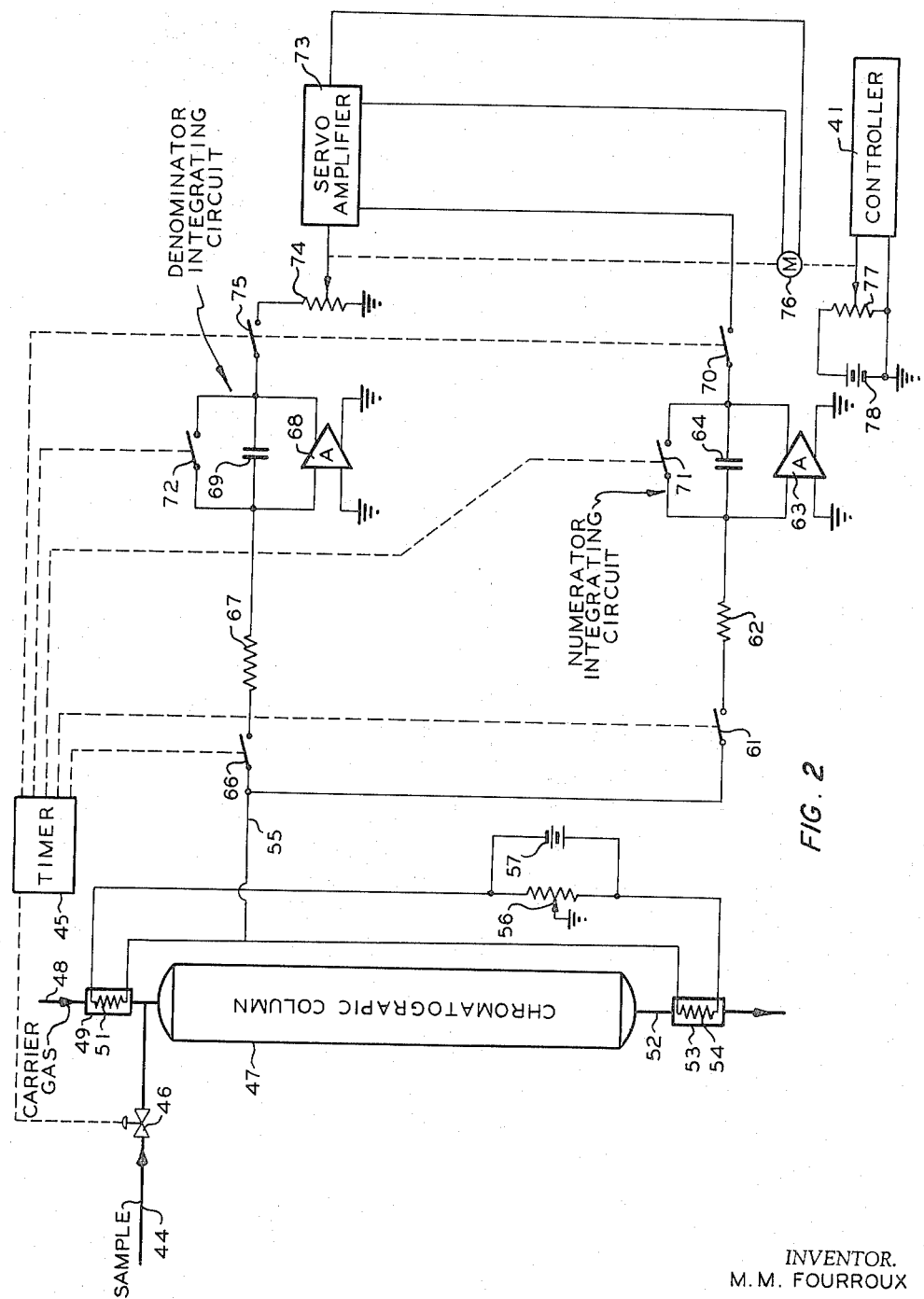

Accordingly, an object of this invention is to provide an improved automatic continuous feedback process control. Another object is to provide a method and apparatus for the automatic continuous process control of a fractionator column, such as a deethanizer column in a natural gasoline plant. Another object is to automatically and continuously control the heat input of a fractionator column notwithstanding variations in feedstock composition, ambient temperature, and other factors. Another object is to improve the control of a process so as to increase the production of specification material and decrease the production of off-specification material. Another object is to replace non-specific measurement control systems or devices with an improved process control which provides specific measurements generally required or implied in product specifications. A further object is to provide a control system which obviates the need of a temperature control loop. Further objections and advantages of this invention will become apparent to those skilled in the art from the following discussion, appended claims, and accompanying drawing in which:

FIGURE 1 is a schematic flow diagram of a fractionator system having the process control features of this invention associated therewith; and FIGURE 2 schematically illustrates circuitry of one embodiment of the process control system of this invention.

The subject invention provides an improved automatic continuous feedback process control. Particularly it provides an improved method and apparatus for controlling a fractionator column whereby samples of material undergoing fractionation are continuously withdrawn from the fractionator column and subjected to cyclic chromatographic analysis, analogs of the concentrations of the various principle or key constituents of each sample cycle are measured, the value of a desired ratio of the measured concentrations of the constituents is computed, and a signal of the computed value of said ratio is transmitted to the fractionator column heat input control means which is readjusted when the computed value of said ratio of said constituents varies from a predetermined value, at which the desired separation occurs, to maintain said predetermined value.

Referring now to the drawing, and to FIGURE 1 in particular, a conventional fractionator column 11 is shown, such as a deethanizer column in a natural gasoline plant. Fractionator column 11 can be provided with the usual vapor-liquid contact equipment, such as trays (e.g., 40) and the like, and other conventional fractionator appurtenance. Feedstock, such as depropanizer bottoms, is introduced by line 12 to the column 11 (e.g., at the 20th tray) at a predetermined flow rate maintained by valve 13 which is controlled by flow rate controller 14. Fractionator bottoms, for example a stream comprising mainly $C_3$, $C_4$ and $C_5$ hydrocarbons, are withdrawn as kettle product via line 16 and passed to an external reboiler 17 where the kettle product is indirectly heat exchanged with a heat exchange medium, such as steam, supplied via line 18, the used heat exchange medium, such as condensate, being withdrawn via line 19 having flow control valve 20 regulating the flow thereof. Vaporized kettle product is recycled via line 21 to the bottom of fractionator column 11 (e.g., above the 1st tray) and liquid product withdrawn from reboiler 17 via line 22, the flow therein being regulated by flow control valve 23 which is in turn maintained by flow recorder controller 24 overriden by liquid level controller 26.

It should be understood that the subject invention is not to be limited to the heat input system described above and illustrated in the drawing since the subject invention is applicable to any heat input system, such as an internal reboiler, or the like.

The low boiling constituents of the feed mixture, for example, overhead comprising mainly methane and ethane, are removed from the column through line 27, the overhead product being cooled by means of cooler 28. The cooled overhead is passed to a reflux accumulator 29, from which uncondensed gases are withdrawn via line 31 having flow control valve 32 therein regulated by pressure controller 33. Alternatively, condensate could be withdrawn in place of, or in addition to, gas from accumulator 29, depending on the type of fractionation carried out in column 11. Condensed reflux liquid is passed from accumulator 29 via line 34 to the column 11, flow of the reflux liquid being regulated by flow control valve 36 adjusted by flow recorder controller 37 overridden by liquid level controller 38.

In the fractionation of a fluid mixture, values of desired ratios of the concentrations of constituents at any point in the column, for example on any particular tray, can be calculated or determined through experience. For a product having a certain predetermined value for said specification, it is desired to maintain certain ratios of constituents at various levels or points in the fractionator column. In order to achieve these desired or predetermined values for said ratios of constituents, for example propane/ethane, the heat input can be regulated and controlled. However, many of the control devices and systems of the prior art are either only semi-automatic, have serious time lags, or are dependent upon tedious batch analyses, making such devices or systems often unsatisfactory.

According to my invention, samples of the fluid mixture undergoing fractionation, or samples of the overhead, sidestream, or kettle product, are substantially continuously withdrawn and subjected to chromatographic analysis for determination of the relative concentrations of principal or key constituents, for example propane and ethane. Having determined such concentrations of constituents, the desired ratio of key constituents, for example propane/ethane, is computed, the resultant computed value is transmitted, for example as an electrical or pneumatic signal, to the heat input control means, adjusting the same when the computed value differs from that of a predetermined value for said ratio at which the desired separation occurs and product of desired specification obtained. For example, in deethanizing natural gas liquids to obtain a kettle product having a propane/ethane ratio of 20/1, it will be desired to maintain a propane/ethane ratio on the first or bottom tray in the column about that of the kettle product. By employing the process control system of this invention in deethanizing such natural gas liquids, it will be possible to maintain the ethane/propane ratio on the first tray in the range between 0.045 to 0.055.

Referring again to FIGURE 1, samples of the fluid mixture undergoing fractionation are withdrawn from column 11, for example from the first tray, via line 44 and passed to a chromatographic analyzer 42 wherein the concentrations of individual constituents under consideration, such as ethane and propane, are determined. The value of the desired ratio of the concentrations of constituents, such as propane/ethane, is computed by ratio computer 43, and a signal representative thereof is transmitted to controller 41 which regulates or controls flow control valve 20 in the condensate line 19, thereby controlling the heat input so as to maintain the desired separation in the column 11 and obtain a kettle product 22 having the desired specification.

Chromatographic analyzer 42 can be any of the known analyzers of this type, for example a Perkin-Elmer Vapor Fractometer Model 184. Analyzers of this type carry out vapor phase chromatography wherein a measured sample is placed in a packed column containing an adsorbent such as a solid adsorbent like charcoal, alumina silica gel or molecular sieve material, or a liquid adsorbent such as hexadecane, octyl sebacate, benzyl ether, or the like, coated on inert particulate solid material. The sample is eluted by passing a carrier gas, such as heluim, through the column, or by heating the column. The various gases or constituents that make up a sample are eluted from the column by the carrier gas in a fixed and known order. As the gases are eluted from the column, their concentrations are determined. This analytical procedure will now be described in relation to the process control system of this invention by reference to FIGURE 2.

In FIGURE 2, a sample of the fluid mixture removed from column 11 of FIGURE 1 is conveyed via line 44 and through sample valve 46 to a packed chromatographic column 47. Valve 46 is opened periodically by means of a timer 45 to introduce predetermined volumes of the sample into column 47. Carrier gas, such as helium, is passed via line 48 through the reference channel 49 of a detector, such as a thermal conductivity cell having a temperature sensitive element or thermistor 51 therein, the carrier gas then being passed through the top of the chromatographic column 47. The carrier gas tends to force the sample material through the column, the several constituents of the sample traveling through the column at different rates of speed. The individual constituents, such as ethane and propane, thus appear in the column effluent 52 at spaced time intervals. The column effluent passes through the sensing channel 53 of a detector, such as thermal conductivity cell having a temperature sensitive element or thermistor 54 therein. The temperature sensitive elements 51 and 54 are part of a Wheatstone bridge comprising potentiometer 56 and voltage source 57. By this arrangement, the thermal conductivities of the fluids flowing through lines 48 and 52 are compared, and a potential representative of the concentration of each desired constituent is generated.

Where it is desired to determine the ratio of the concentration one constituent to that of another, for example propane/ethane, or $X/Y$, and where one of the components, X, such as ethane, appears in the chromatographic column effluent during the interval time $t_1-t_2$, and the other component, Y, such as propane, appears in the effluent during the time interval $t_3-t_4$, the thermal conductivities of components X and Y are integrated and their ratio computed, as follows, reference being again made to FIGURE 2.

In FIGURE 2, with all of the switches operatively connected to timer 45 in their open positions as shown, elution of the sample is carried out. Timer 45 can be any conventional device of this type, comprising, for example, a plurality of cams which are rotated by a constant speed motor. These cams operate the switches in the sequence described hereinafter. During time interval $t_1-t_2$, when component X is present in the effluent, switch 61 is closed by timer 45 and the voltage change in the Wheatstone bridge due to the flow of X past thermistor 54 is applied by conductor 55 to a numerator integrating circuit as follows. Voltage is applied across resistance 62 to an operational amplifier 63 shunted by a condenser 64 in the feedback circuit of the amplifier. The timer 45 then opens switch 61 at the end of time interval $t_1-t_2$, leaving the voltage, representative of the concentration of component X, stored in condenser 64. When component Y appears in the effluent during time interval $t_3-t_4$, timer 45 maintains switch 66 in a closed position, thereby allowing the voltage generated during time interval $t_3-t_4$ to be applied to a denominator integrating circuit as follows. With switch 66 closed, the voltage is applied across resistance 67 to operational amplifier 68 shunted by condenser 69 in the feedback circuit of amplifier 68. At the end of time interval $t_3-t_4$, timer 45 opens switch 66 leaving the voltage representative of the concentration of component Y stored on condenser 69.

After the elution of component X and Y, timer 45 closes switches 70 and 75 connected to the two integrating circuits. The integrated voltage of component X is then applied to one input thermal of a servo-amplifier 73, and the integrated voltage of component Y is applied through motor-adjustable potentiometer 74 to the second input thermal of servo-amplifier 73. Servo-amplifier 73 can be any conventional device of this type, such as that described in the Electronic Control Handbook, Batcher and Moulic, Caldwell-Clements, Inc., New York, 1946, page 298. The output of servo-amplifier 73 is applied to a servo-motor 76 which adjusts the contactor on potentiometer 74 in an amount equal to the ratio of the voltage of component X to the voltage of component Y to balance the second input voltage against the first input voltage. Servo-motor 76 simultaneously adjusts the contactor of potentiometer 77, shunted by battery 78, to supply an electrical signal to controller 41 equal to said computed ratio.

Controller 41 can be any conventional commercially available device which converts an input electrical voltage into a corresponding output pneumatic pressure, a transducer of this type being described in Bulletin A-710, of the Swartwout Company, Cleveland, Ohio. This pneumatic signal resets a valve positioner, for example of the type described in Foxboro Industrial Instrumentation Bulletin 456, page 112, which adjusts the flow control valve 20 in the condensate line 19 of FIGURE 1. For example, if the computed value of the ratio $X/Y$ is greater than that of the desired value of said ratio, flow control valve 20 will be opened an incremental amount so as to increase the heat input to the desired extent necessary to maintain the desired value of said ratio, and vice versa.

Before starting another sample cycle, timer 45 opens switches 70, 75, momentarily closes switches 71, 72 to discharge condensers 64, 69 and then open switches 71, 72, to another sample cycle.

The subject invention is not limited to computing the simple ratio of the concentration of one component X to that of another component Y. It is within the scope of this invention to determine any number of other ratios of components, for example (1) $$\frac{X}{X+Y}$$

(2) $$\frac{X+Z}{X+Y+Z}$$

(3) $$\frac{Y}{X+Y+Z}$$

By changing the sequence of timer 45, the integrating and computing circuitry of FIGURE 2 can be used in the cases of rations (1), (2), and (3) above. For example, in the case of ratio (1), during the time interval when X is eluted switches 61 and 66 are closed. After X is eluted, and before Y is eluted, the numerator circuit is opened by opening switch 61. During elution of Y, switch 66 is also opened. The ratio is then computed as before.

In the cases of ratios (2) and (3), or any other ratio, the switch 61 of the numerator circuit is kept closed during elution of all constituents which appear in the numerator of the ratio, and switch 66 of the denominator circuit is kept closed during elution of all constituents which appear in the denominator of the ratio. Of course, the order of elution of the various constituents of a sample will be known or can be readily determined beforehand, and the timer 45 programmed accordingly.

The subject invention has numerous applications. For example, in the isomerization of pentane, the ratio iso-$C_5$/total $C_5$ can be computed and controlled according to this invention; in butane dehydrogenation, butylene/n-$C_4$; butene dehydrogenation, butadiene/butylene; butane cracking, ethylene/n-$C_4$; propane cracking, ethylene/$C_3H_8$; HF alkylation, isobutane/olefins; butane isomerization, iso-$C_4$/total $C_4$; manufacture of butadiene, impurities/butadiene plus impurities; manufacture of ethylene, impurities/ethylene plus impurities; manufacture of cyclohexane, impurities/cyclohexane plus impurities; manufacture of hexane, n-hexane/n-hexane plus impurities; natural gas liquids deethanization, ethane plus butane/ethane plus propane plus butane, ethane/ethane plus propane; and the like.

A natural gas liquids deethanizer column can be operated according to this invention as shown in Table I.

Table I

| | Feed, mol Percent | Kettle Product, mol Percent |
|---|---|---|
| Methane | 4.4 | 0.0 |
| Ethane | 12.3 | 0.6 |
| Propane | 37.7 | 36.2 |
| Isobutane | 7.0 | 9.2 |
| n-Butane | 24.6 | 31.1 |
| Isopentane | 6.2 | 9.6 |
| n-Pentane | 8.9 | 13.4 |

It is also within the scope of my invention to continuously measure the temperature in the fractionator column, for example at or near the bottom of the column, by means of a conventional temperature recorder controller which is operatively connected to the heat input control means, such as valve 20 in FIGURE 1, and to automatically pneumatically reset the setpoint of the temperature recorder controller by means of the ratio computer-operated controller, such as controller 41 in FIGURE 2, to maintain the desired ratio of constituents undergoing fractionation.

Various modifications and alternatives of this invention should become apparent to those skilled in the art without departing from the scope and spirit of this invention, and it should be understood that the latter is not to be unduly limited to that set forth herein for illustrative purposes.

I claim:

1. In the operation of a fluid mixture process having a process control variable, a method of controlling said variable so as to maintain a predetermined value for a desired ratio of the concentrations of selected constituents in said fluid mixture at a predetermined point in said process, comprising: withdrawing samples of said fluid mixture from said process, subjecting said samples to cyclic chromatographic analysis to determine the concentrations of said constituents in said samples, computing the value of said ratio of said constituents in said samples, and controlling said process variable in accordance with said computed value to maintain said predetermined value for said ratio at said point in said process.

2. In the fractionation of a fluid mixture in a fractionating column, a method of controlling the heat input of said column so as to maintain a predetermined value for a desired ratio of concentrations of selected constituents in said fluid mixture at a predetermined point in said column, comprising: withdrawing samples of said fluid mixture from said column at said predetermined point therein, subjecting said samples to cyclic chromatographic analysis to determine the concentrations of said selected constituents in said samples, computing the value of said ratio of said constituents in said samples, and regulating said heat input in accordance with the computed value for said ratio to maintain said predetermined value for said ratio at said point in the column.

3. In the operation of a fluid mixture separation system having a process control variable means, a control system comprising means for cyclically chromatographically analyzing samples of said fluid mixture undergoing separation in said separation system to determine the concentration of selected constituents in said fluid mixture, means for determining the value of a desired ratio of the concentrations of said constituents in said samples, and means operatively connected to and controlled by said last-mentioned means for controlling said process variable means to maintain said desired ratio of said constituents in said separation system at a predetermined value.

4. In the fractionation of a fluid mixture in a fractionator system comprising means to withdraw products of fractionation from said column, and means to supply heat to said column to aid in carrying out said fractionation, a control system comprising means for cyclically chromatographically analyzing samples of the fluid mixture undergoing said separation to determine concentration of selected constituents therein, means for determining the value of a desired ratio of the concentrations of said constituents in said samples, and means connected to and controlled by said last-mentioned means for controlling said means to supply heat to maintain said desired ratio of said constituents in said fractionation system at a predetermined value.

5. In a fluid mixture separation system wherein a fluid mixture is introduced into a separation column, a first product stream is withdrawn from one end of said column, a second product stream is withdrawn from another end of said column, and heat input means are employed to supply heat to said column, a control system comprising means for continuously withdrawing a sample stream from said column, chromatographic analyzer means for the cyclic analysis of said samples to determine the concentrations of selected constituents therein, means to compute the value of a desired ratio of the thus determined concentrations of said constituents and put out a signal representative of the computed value of said ratio, and means operatively connected to and controlled by said last-mentioned means to control said heat input means to thereby maintain said desired ratio of said constituents in said separation column at a predetermined value.

6. The control system of claim 5 wherein said chromatographic analyzer means further comprises means to provide output signals representative of the concentrations of said constituents being detected and analyzed, and wherein said means to compute comprises means to integrate said output signals representative of the concentrations of said constituents appearing in the numerator of said ratio, means to integrate those output signals representative of the concentrations appearing in the denominator of said ratio, means to apply said output signals of said analyzer means in sequence to said means to integrate, means operatively connected to said means to integrate to receive the thus integrated output signals and compute the ratio of said integrated output signals, and means to establish a signal representative of the computed value of said desired ratio, and said means to control said heat input means being operatively connected to said means to establish.

7. The control system of claim 5 wherein said analyzer means comprises a chromatographic column filled with a material which selectively retards passage therethrough of constituents of a fluid mixture, means to pass a carrier gas through said chromatographic column, and means to introduce a sample of the material to be analyzed into said chromatographic column so as to be carried therethrough by said carrier gas, means to compare the temperatures of the carrier gas passed into and the effluent removed from said chromatographic column and to establish an electrical signal representative thereof, and said means to compute comprises first and second means to integrate electrical signals, means to apply said electrical signal in sequence to said first and second means to integrate, and means to establish a signal representative of the ratio of the output signals of said first and second means to integrate.

8. The control system of claim 7 wherein said means to establish comprises a potentiometer, means to apply the output of one of said first and second means to integrate across the end terminals of said potentiometer, means to compare the output of the other of said first and second means to integrate with the potential between the contactor of said potentiometer and one end terminal thereof, and means responsive to said means to compare to adjust the contactor of said potentiometer until the voltages being compared are equal, the position of said contactor being representative of the ratio of the output signals of said first and second means to integrate.

9. The control system of claim 8 wherein bottoms are withdrawn from said separation column and said heat input means comprises an external reboiler adapted to heat said bottoms and a heat exchange medium supply conduit for supplying heat to said reboiler, said conduit having a flow control valve therein operatively controlled by said control system to maintain said desired ratio of constituents.

10. In the fractionation of depropanized natural gasoline in a fractionation column, wherein an overhead comprising methane and ethane is withdrawn from the column, a bottoms product comprising $C_3$, $C_4$ and $C_5$ hydrocarbons is withdrawn from said column and indirectly heat exchanged with steam, and the resulting vaporized bottoms product is returned to said column, a method of controlling the flow rate of said steam in said heat exchange step to maintain a predetermined value for the ratio of the concentration of propane to the concentration of ethane at a predetermined point in said column, comprising withdrawing samples of fluid mixture from said column at said predetermined point therein, subjecting said samples to cyclic chromotographic analysis to determine the relative concentrations of propane and ethane in said samples, computing said ratio of propane to ethane in said samples, and regulating said flow rate of steam in accordance with the thus computed ratio to maintain said predetermined value for the ratio of propane to ethane at said point in the column.

References Cited by the Examiner

UNITED STATES PATENTS

| | | | |
|---|---|---|---|
| 2,692,820 | 10/54 | Alway et al. | |
| 2,764,536 | 9/56 | Hutchins | 62—37 X |
| 2,826,908 | 3/58 | Skarstrom. | |
| 2,835,116 | 5/58 | Miller | 62—21 |
| 2,849,371 | 8/58 | Gilmore. | |
| 2,994,646 | 8/61 | Kleiss | 196—132 X |
| 3,002,818 | 10/61 | Berger | 196—132 X |
| 3,009,864 | 11/61 | Webb | 62—37 X |
| 3,020,213 | 2/62 | Lupfer | 196—132 X |
| 3,049,908 | 8/62 | Kindred et al. | 73—23 |
| 3,049,909 | 8/62 | Thomas | 55—67 X |
| 3,057,183 | 10/62 | DeFord | 73—23 |

OTHER REFERENCES

"Gas Chromatography Growing," article in Chemical & Engineering News, April 9, 1956, pages 1692 to 1696.

REUBEN FRIEDMAN, *Primary Examiner.*

WESLEY COLE, WALTER BERLOWITZ, HERBERT L. MARTIN, *Examiners.*